United States Patent [19]
Forsberg et al.

[11] Patent Number: 5,461,185
[45] Date of Patent: Oct. 24, 1995

[54] RADIOACTIVE WASTE MATERIAL DISPOSAL

[76] Inventors: Charles W. Forsberg, 155 Newport Dr.; Edward C. Beahm, 106 Cooper Cir., both of Oak Ridge, Tenn. 37830; George W. Parker, 321 Dominion Cir., Knoxville, Tenn. 37922

[21] Appl. No.: 230,156

[22] Filed: Apr. 19, 1994

[51] Int. Cl.$^6$ ................................................ G21F 9/00
[52] U.S. Cl. ........................ 588/11; 588/18; 588/201; 976/DIG. 385; 976/DIG. 394
[58] Field of Search ........................... 588/11, 18, 201; 976/DIG. 385, DIG. 394; 501/155

[56] References Cited

U.S. PATENT DOCUMENTS

| | | | |
|---|---|---|---|
| 3,365,578 | 1/1968 | Grover et al. | 250/493.1 |
| 4,097,401 | 6/1978 | Guber et al. | 588/12 |
| 4,314,909 | 2/1982 | Beall et al. | 588/11 |
| 4,351,749 | 9/1982 | Ropp | 588/11 |
| 4,395,367 | 7/1983 | Rohrmann et al. | 588/11 |
| 4,404,129 | 9/1983 | Penberthy et al. | 588/11 |
| 4,464,294 | 8/1984 | Thiele | 588/11 |
| 4,847,008 | 7/1989 | Boatner et al. | 588/11 |
| 4,847,219 | 7/1989 | Boatner et al. | 501/27 |
| 5,098,645 | 3/1992 | Forsberg | 376/272 |
| 5,120,342 | 6/1992 | Richards | 65/178 |
| 5,202,100 | 4/1993 | Nagel et al. | 423/5 |

FOREIGN PATENT DOCUMENTS 2484126  12/1981  France.

OTHER PUBLICATIONS

*Abstract*, Europe EP 71–927, Aug. 7, 1981.
*Abstract*, Japan J5 9044–699–A, Sep. 8, 1982.
*Abstract*, Japan J5 9127–000–A, Jan. 12, 1983.
*Abstract*, Japan J6 1250–596–A, Apr. 30, 1985.
*Abstract*, Japan J6 3241–400–A, Mar. 38, 1987.

*Primary Examiner*—Ngoclan Mai
*Attorney, Agent, or Firm*—David E. Breeden; Stephen D. Hamel; William R. Moser

[57] ABSTRACT

The invention is a process for direct conversion of solid radioactive waste, particularly spent nuclear fuel and its cladding, if any, into a solidified waste glass. A sacrificial metal oxide, dissolved in a glass bath, is used to oxidize elemental metal and any carbon values present in the waste as they are fed to the bath. Two different modes of operation are possible, depending on the sacrificial metal oxide employed. In the first mode, a regenerable sacrificial oxide, e.g., PbO, is employed, while the second mode features use of disposable oxides such as ferric oxide.

28 Claims, 2 Drawing Sheets

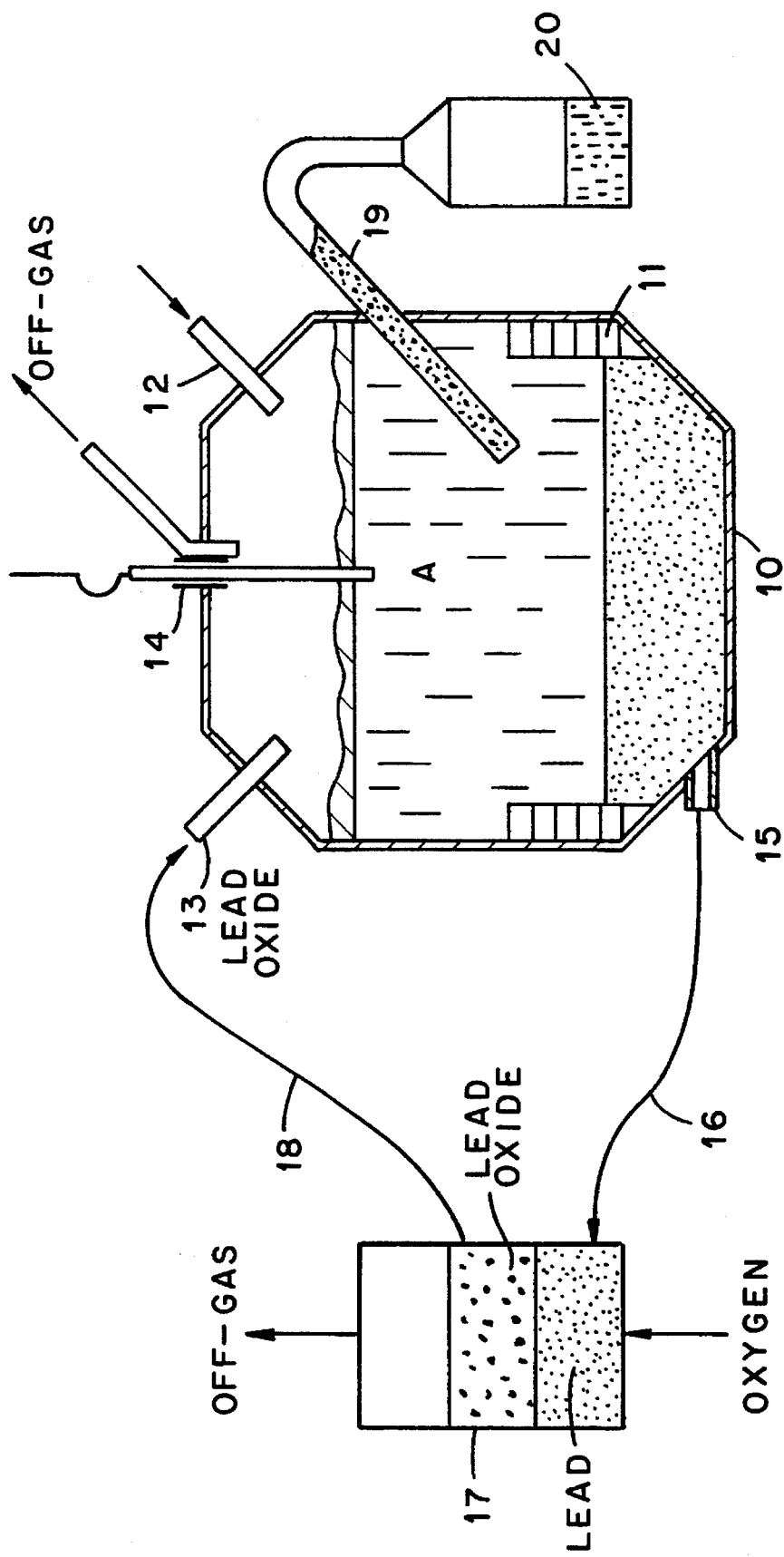

RADIOACTIVE WASTE MATERIAL DISPOSAL

The United States of America has rights in this invention pursuant to contract no. DE AC05840R21400 between the U.S. Department of Energy and Martin Marietta Energy Systems, Inc.

BACKGROUND OF THE INVENTION

Industrial, utility, and military nuclear operations produce radioactive waste materials which must be treated in an appropriate manner before disposal to prevent environmental contamination. Additionally, as a result of recent treaties requiring the reduction of nuclear arsenals, development of procedures for disposal of weapons grade plutonium has assumed increasing urgency.

Because present technology does not provide satisfactory and economic conversion of the wastes' and weapons' radioactive nuclear components into non-radioactive nuclides, disposal of highly radioactive materials in geologic repositories remains the currently favored solution to the problem. However, because of the long half life of some radioactive nuclear species, the wastes must be stored in a form which minimizes the possibility of release.

In addition to the radioactive nuclear components of the wastes, the bulk wastes may also comprise or contain a variety of miscellaneous associated materials, such as rod assemblies, fuel containers, cladding, liners, and binders. These accompanying materials may or may not be radioactively contaminated, but they also require disposal if reuse or recycle thereof is not contemplated or feasible. Many of these extraneous materials are metal, and are not readily dissolvable in glass, the preferred storage medium.

Two particular types of waste, light-water reactor spent fuel and solidified high-level waste, have been considered well suited to repository disposal. Other types of spent nuclear fuel, e.g., miscellaneous spent fuels, have individual characteristics which have, until the invention herein, made disposal more difficult. Thus, many such fuels corrode or dissolve the containing media. Additionally, since the nuclear critical mass for some fuels is small, whatever method of disposal is adopted must prevent the fuel from becoming critical. In some cases, the spent fuel is encased in or at least partially surrounded by a metal cladding, such as a zirconium tube, which poses a major problem in the treatment of the fuel if dispersal or encasement in glass is contemplated. That is, metal claddings, as mentioned, normally do not dissolve in glass, and the metal may react with the components of the glass. Finally, the wastes must be disposed of in a form which is easily stored and safeguarded.

Current technology for solidifying high level radioactive waste involves heating the wastes, which consist primarily of radioactive actinides and fission products which have been processed into the form of nitrate salts, so that the nitrate wastes are destroyed with the formation of oxides and off-gases of water vapor and other minor gases. For this approach to be used, the wastes must be processed first into the nitrate form. The actinide and fission product oxides are then dissolved in a molten glass, and the glass containing the wastes is poured into containers, such as steel cylinders, and the glass is allowed to cool. The containers containing the waste are suitable for storage, the solidified glass being substantially impervious to chemical attack. While this procedure provides a suitable product for storage, the process creates disposal problems of its own.

In addition to the problems aforementioned, the disposal of weapons grade plutonium poses further difficulties. In particular, if the plutonium is not destroyed, it must be processed to a form which makes the plutonium inaccessible for nuclear weapons use. Accordingly, there has existed a need for the efficient processing of solid radioactive waste, particularly spent reactor fuel(s), and, more recently, for the treatment of weapons grade plutonium. The invention addresses these needs.

SUMMARY OF THE INVENTION

Accordingly, in a principal embodiment, the invention relates to a process for direct conversion of solid radioactive waste, particularly spent nuclear fuel and its cladding, if any, into a solidified waste glass, the process being capable of two different modes of operation. As used herein, the term "radioactive waste" is to be understood to include not only radioactive material per se which requires disposal, but to include miscellaneous attendant materials, such as metal and/or carbon assemblies or Cladding, ceramics, amorphous solids, and organic solids, including various polymeric materials, the only required characteristic of such "waste" being that it comprise or consist of at least one component which is an oxidizable metal. According to the invention, a bath of molten glass is provided initially, the molten glass bath containing a dissolved "sacrificial" oxidizing agent capable of oxidizing such elemental metal and any oxidizable carbon present in the waste. The waste is fed directly to the molten glass bath where it or components thereof are dissolved or oxidized by the oxidizing agent. Waste components which are oxides are dissolved in the bath directly, and metal oxides produced from nuclear components, materials, assemblies, fuels or cladding in the waste by the oxidation are dissolved or solublized in the molten glass and remain therein. Carbon dioxide produced, if any, is separated from the molten glass bath. In one approach and sequence of operation, the oxidizing agent is selected from those metal oxides which, upon oxidation of the waste or component materials, produce, at the temperature of the bath, the metal of the sacrificial metal oxide as a solid or molten byproduct elemental metal having limited solubility in the glass bath. As indicated, the spectrum of radioactive waste which may be processed by the invention is extensive, and will include, but is not limited to, miscellaneous spent nuclear fuels, hot cell waste, high level waste, laboratory waste, filters, low level waste, etc. In terms of radioactivity level, the level of the final disposable glass product produced by the invention depends largely on the character of the initial waste.

As used herein, the term "sacrificial oxide" is understood to include mixtures of appropriate oxidizing agent metal oxides. Correspondingly, the term "byproduct elemental metal", in referring to the product of the oxidation, will also be understood to include mixtures of metals where a mixture of metal oxides of the appropriate type are used as the sacrificial oxidizing agent. The "byproduct" elemental metal is recovered from or separated from the bath by a simple operation, such as density separation. After removal, the elemental metal may be oxidized, the oxide recovered, and the recovered metallic oxide may be sent for use as the sacrificial oxidizing agent in the molten bath. Periodically, or continuously, molten glass containing the solubilized metal values may be recovered from the glass bath, or it may be treated further. Preferably, the molten glass is poured into canisters and stored.

In the second mode of the invention, a bath of molten glass is also provided, but the glass is selected from specific glass compositions which are capable of dissolving or incorporating different specially selected sacrificial metal oxides and the oxide products of such oxides' reduction. In this embodiment, accordingly, the bath also contains the "sacrificial" metal oxide, but the sacrificial metal oxide is selected from those metallic oxides which, upon oxidation of the waste and/or metal contents, will be converted to another oxide "byproduct" or reduced metal oxide that is soluble in and remains in the glass on solidification. For example, the metal oxide added to the bath may be $Fe_2O_3$, the form after oxidation being FeO. Upon oxidation/dissolution of, e.g., spent fuel and cladding into the molten glass bath, the molten glass containing spent fuel and oxidized cladding values, along with the dissolved byproduct oxide, is poured into canisters and stored. As used herein, the term "metal oxide" should be understood to include mixtures.

In another embodiment, waste of radioactive material(s) which does not contain an oxidizable metal, but which contains carbon in oxidizable form, and which waste, except for possibly the oxidizable carbon, is soluble in molten glass (such solid waste being referred to hereinafter as radioactive waste material containing carbon) may be added to the molten glass bath containing the sacrificial metal oxide, in either of the approaches described, supra. The sacrificial oxide oxidizes the carbon to carbon dioxide under the conditions of the bath, while itself being converted to either elemental metal or a reduced metal oxide. The $CO_2$ is easily separated, and the remainder of the waste is dissolved in the molten glass bath. Suitable wastes include, but are not limited to, oxide-containing reactor wastes with carbon assemblies, as well as wastes which contain or comprise SiC, and/or graphite.

Again, embodiments of the invention wherein weapons grade plutonium may be processed, in the molten bath, in either of the sequences described above, represent a particularly advantageous utilization of these procedures. The term "weapons grade plutonium", as used herein, is understood to include, in addition to plutonium metal, up to five or ten percent of the oxide or various alloying materials employed in such and known to those skilled in the art. The term is also understood to comprise various claddings, coatings, etc., of the plutonium which may be fed directly with it to the molten glass, as described hereinbefore with the waste materials mentioned, supra.

Accordingly, the plutonium is oxidized as described, preferably while "diluting" the plutonium oxide in the finished glass by the presence or addition of other waste, such as spent fuel and cladding, to the molten glass bath. Preferably, in such cases, the "diluent" is selected from nuclear reactor spent fuels, e.g., navy reactor spent fuel, breeder reactor fuels, and light-water reactor fuels.

The particular glass forming materials employed in the first embodiment may be varied considerably. The term "glass" is used in a generic sense, and is taken to include, but is not limited to, borosilicate glasses, silica glasses, glass-ceramics, e.g., as described in U.S. Pat. No. 4,314,909 and U.S. Pat. No. 4,464,294, and polymeric aluminum phosphate glasses, and mixtures thereof. As indicated, in the second embodiment of the invention, the glass is selected so that the sacrificial oxide, oxides in or the product from the waste, i.e., derived from the waste, and the oxide formed from the reduced metal from the sacrificial oxide are soluble therein. There is thus a cooperation of the particular glass selected and the sacrificial oxide to achieve the results of the invention. Borosilicate glasses, such as sodium borosilicate, are preferred in this embodiment. It is within the scope of the invention to generate the fused glass in situ in the zone or bath concurrently with the addition of the sacrificial oxide.

The temperatures employed initially in the process must be sufficient to fuse glass or glass forming material(s) and dissolve and/or fuse the sacrificial oxide. As those skilled in the art will recognize, sufficient additional heat must be added to the bath to maintain a fused state because of the addition of a solid, cooler material, i.e., the radioactive waste, to the bath. In general, a temperature 100° to 300° C. above the fusion temperature of the glass forming material will be maintained. The radioactive waste will be present or added at a rate to insure reaction/dissolution, consistent with furnace design, volume of sacrificial oxide present, etc. However, care must be taken to avoid such excess of waste as might interfere with the properties of the glass combination formed. In general, the ratio of waste and extraneous metal material (if any), to glass should preferably be regulated to provide, in the glass separated, from 10 to 30 percent of waste metal oxide, based on the weight of the final separated glass mixture. Many wastes contain components' that can be used as glass formers or modifiers, e.g., silicon oxide, aluminum oxide, etc. In such cases, the maximum waste loadings for the glass may be much higher since these components are used as part of the glass structure.

With these considerations in mind, to insure the complete reaction of waste and attendant components, the sacrificial oxide will normally be provided in the bath in at least stoichiometric amount with respect to the oxidizable elemental metal and/or carbon values thereof, and preferably from 2 to 6 times the stoichiometric amount. The amount of such metal and carbon in the particular waste treated according to the invention will vary depending on the nature of the waste. Thus, the amount of oxidizable metal and carbon in the radioactive waste may vary from a very small amount, say one percent or less, by weight, up to 100 percent by weight. The amount of oxidizable carbon in solid radioactive waste containing carbon may range from one percent by weight to over 99 percent by weight.

As indicated, in the first embodiment herein where the sacrificial oxide may be regenerated from the reduced metal, the sacrificial oxide may also be present in great excess in the bath, with a given or particular waste, to enhance dissolution of the waste. Excess sacrificial oxide may be removed from the glass at the end of processing by addition of carbon or other reductant to reduce the oxide to the recoverable metal. As those skilled in the art will recognize, organic material in the radioactive waste will be converted, at the bath temperatures, to carbon dioxide and water, which are easily removed.

The nature of the sacrificial oxide will depend, of course, on the particular embodiments chosen. In each case, the metal of the sacrificial oxide must be less positive in an electromotive force sense than the elemental metal of the waste to be treated, i.e., it must be reduced by the metal(s) of the waste or attendant materials, e.g., cladding, or of carbon. In the embodiment of the invention where the metal of the sacrificial oxide is separated and regenerated, suitable sacrificial oxides, depending on the nature of the waste, will include, but are not limited to, $PbO$, $HgO$, $SnO_2$, and $Bi_2O_3$. Where the sacrificial oxide is not totally reduced, i.e., where the sacrificial metal oxide is reduced to another oxide instead of a metal and remains in the glass forming material, suitable sacrificial oxides will include, but are not limited to, $Fe_2O_3$, $CrO_3$, $MnO_2$, and $UO_3$. The process of the invention may be conducted in either batch or continuous manner.

BRIEF DESCRIPTION OF THE DRAWINGS

FIG. 2 is a schematic illustration utilizing the type of sacrificial metalsoxide of FIG. 1, but conducting the operation in an arrangement which permits a batch type operation.

DETAILED DESCRIPTION OF THE INVENTION

Figure 1:
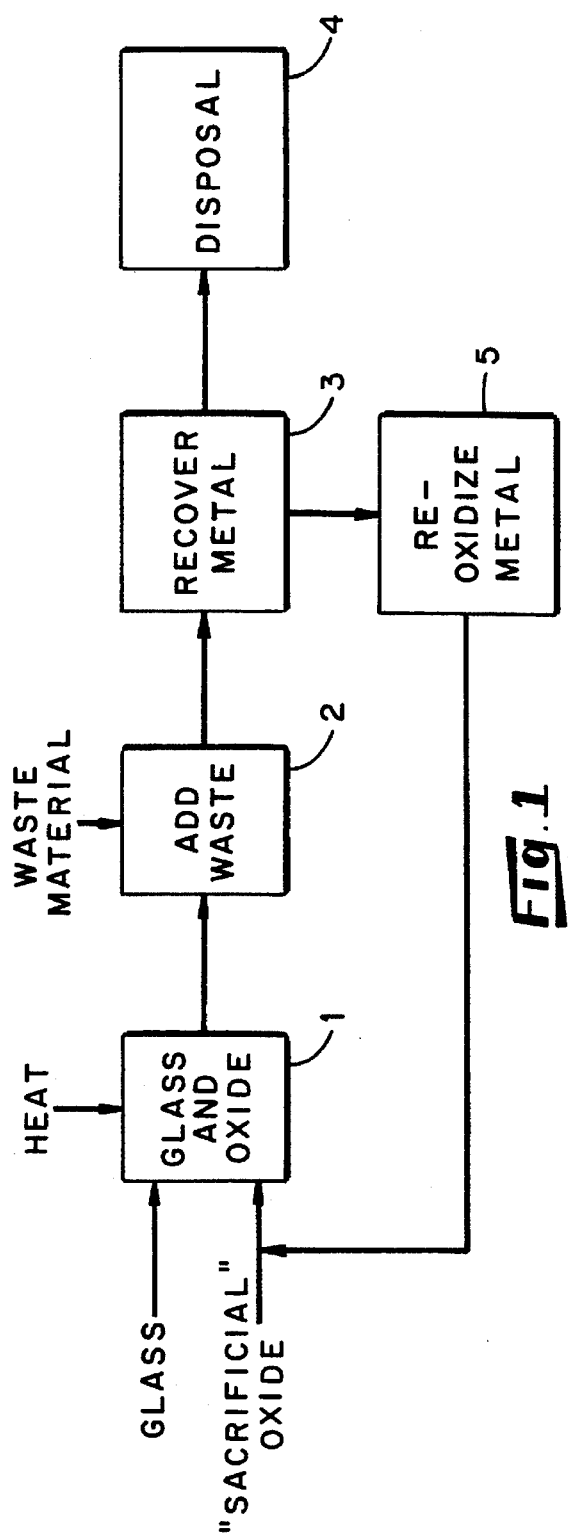
FIG. 1 is a schematic process flow diagram of the embodiment of the invention in which a sacrificial metal oxide is employed which produces a separable metal.

As shown in FIG. 1, a suitable glass forming material is heated to the melting point of the material and mixed with a sacrificial oxide in zone 1, forming a molten glass mixture containing at least substantially totally dissolved sacrificial metal oxide. Molten glass mixture is forwarded to zone 2 where radioactive waste, such as spent nuclear reactor fuel rods and their metal cladding, is added to the molten mixture. It is an important feature of the invention that the sacrificial oxide is present in the molten glass bath when the feed of radioactive waste is introduced, so that the sacrificial oxide may readily oxidize the metal of the waste and aid in dissolution of metal oxides.

The amount of sacrificial metal oxide provided in the molten glass mixture is selected so that the ratio of sacrificial metal oxide to the elemental metal and any carbon of the waste material is sufficient to insure that any metal from the waste or its cladding will be in the oxide state or converted thereto and thus soluble in or dissolved into the molten glass. The sacrificial oxide (MO) reacts with the metal Me, e.g., plutonium, of the waste and/or cladding (and with any oxidizable carbon present) according to the following general reaction:

$$MO + Me \rightarrow M + MeO \qquad (1)$$

Reaction mixture may then be forwarded to zone 3, where the metal M is separated from the sacrificial oxide. If the sacrificial oxide chosen comprises a metal M having a relatively low elemental melting point, the separation may be achieved simply, such as by density or decantation. If the metal M has a high melting point, decantation or filtration may be used. Molten glass mixture containing the converted radioactive waste is forwarded to zone 4 where it is transferred to containers and allowed to solidify. The metal M, separated in zone 3, is forwarded to zone 5 where it is reoxidized and returned to use in zone 1.

In the illustration of FIG. 2, a ceramic lined (e.g., fired alumina) furnace 10 contains a molten bath or mass of glass (designated generally as A) generated and maintained by a heat source (induction heater) 11. As alternate construction, furnace 10 may employ a cold wall, wherein a coating of solidified glass from the bath lines the cooled inner wall surface and protects the furnace, or both a ceramic liner and cold wall construction may be utilized.

The volume of glass, which may, for example, comprise or consist of lead borosilicate glass, is maintained in furnace 10 by addition of glass frit via tube 12. The optimum formula for dissolution, in the case of this glass, will range from about 1 mole of PbO per mole of $B_2O_3$ to about 3 moles of PbO per mole of $B_2O_3$. Sacrificial metal oxide, in this case PbO, is supplied to the bath via tube 13. Spent fuel rods (uranium oxide clad with zirconium) are fed to the melted glass bath through an entry 14. Unmelted frit (and perhaps waste) forms a crust on the melt. The stoichiometric ratio of PbO to the elemental metal of the fuel cladding is maintained at about 2. The PbO reacts with the zirconium according to the reaction:

$$2PbO + Zr \rightarrow 2Pb + ZrO_2 \qquad (2)$$

The uranium oxide and zirconium oxide are soluble in the glass bath, while the lead, molten at the temperature of the bath (about 1000° C.) forms a separate lower layer in the furnace 10. The separate layer serves several functions in the bath. Normally, the glass and all expected wastes have lower densities than lead; waste heavier than the glass will float at the glass-lead interface while being dissolved. This feature serves to protect the bottom liner from physical and chemical attack by the unprocessed waste or-the sacrificial oxide. The lead layer also provides a thermal and corrosion barrier between glass and liner. The molten lead is removed from the furnace through outlet 15 and transferred by line 16 to oxidation zone 17. Oxygen is blown through the lead, forming solid lead oxide, which is easily separated from the surface of the molten lead, as shown. The separated solid lead oxide is then sent via line 18 for use in furnace 10 through entry 13. Concurrently, molten lead borosilicate glass containing converted radioactive waste values is removed through line 19 to canister 20 and allowed to cool and solidify. In a further embodiment, not shown, one or more additional glass baths, connected serially, may be provided. In such case, the first bath serves as a rough oxidizing and dissolution zone. Periodically or continuously, molten glass containing dissolved and/or oxidized waste is removed from a suit, able location in the first glass bath and sent to a second bath (optionally smaller) where waste, glass, glass precursors, PbO, or $B_2O_3$ may be added as desired to produce a glass product having predetermined desired composition or characteristics. A second bath thus serves to optimize or fine tune the concentrations of the components of the glass-waste composite. Elemental metal from the superficial oxide may or may not be separated from the second bath. If separated therefrom, the metal may be sent to the first bath or the oxidation zone. Additional serial glass baths may be employed as desired or needed to produce good glass.

Figure 3:
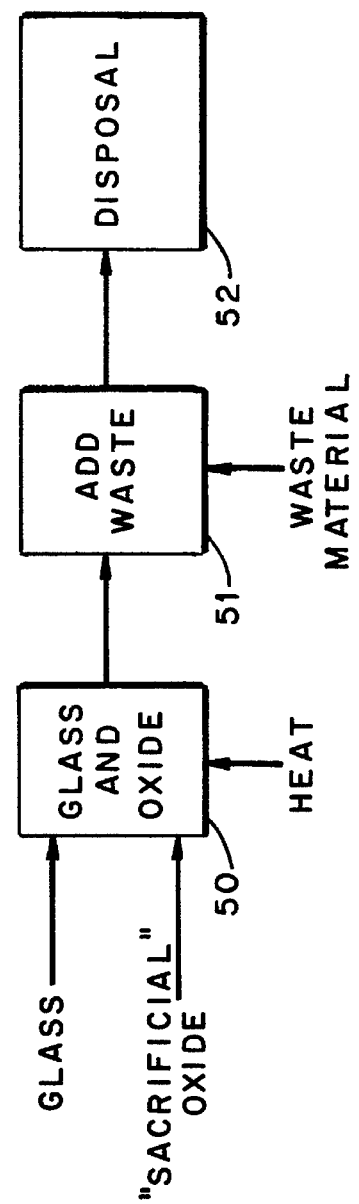
FIG. 3 is a schematic process flow diagram of the embodiment of the invention wherein the metal oxide resulting from the oxidation of the waste remains in the glass.

In FIG. 3, a sacrificial oxide, such as $Fe_2O_3$, is selected and mixed with a suitable glass, such as sodium borosilicate glass, and the mixture is heated to fusion in zone 50, the ferric oxide dissolving in the molten glass. The molten glass containing the ferric oxide is passed to zone 51 where the waste material is added, with additional heat being supplied. The ferric oxide is provided in an amount sufficient to allow oxidation of all the elemental metal of the waste material, including any assembly or cladding, while insuring that little, if any, of the ferric oxide is converted all the way to iron. Stated differently, enough $Fe_2O_3$ is employed so that the iron in the mixture is not totally reduced but remains as FeO. Since the FeO is soluble in the molten borosilicate glass, separation of the iron values is not necessary, and the molten glass mixture containing metal oxides derived from waste and/or cladding values and FeO is transferred in zone 52 to suitable containers. In any embodiment herein where $CO_2$ is generated from oxidation of carbon, it may simply be removed as off-gas, as illustrated in FIG. 2.

As mentioned, the invention has particular application to the treatment of weapons grade plutonium. Preferably, the plutonium is fed, along with other waste material, e.g., spent light-water reactor fuel, in the procedure of FIG. 2. For illustration only, the molar ratio of spent fuel to plutonium should be at least about 6, preferably from about 10 to about 100, e.g., 20 to 1, and the final glass concentration of plutonium as oxide in the glass composite may be from about 0.1 percent to about 5.0 percent by weight. Addition of spent fuel with weapons grade plutonium serves to isotopically dilute the weapons grade plutonium with reactor grade plutonium, combines the weapons grade plutonium with highly radioactive materials, and produces a final glass material having fewer safety, security, and proliferation concerns.

What is claimed is:

1. A process for the conversion of solid radioactive waste comprising providing a bath of molten glass containing a sacrificial metal oxide capable of oxidizing elemental metal and carbon in a radioactive waste while the metal of the sacrificial oxide is reduced to elemental metal which has limited solubility in said molten glass;

introducing solid radioactive waste into said bath of molten glass containing said sacrificial metal oxide, and converting elemental metal in said waste into oxides of said metal which are solubilized in said molten glass, and the metal of the sacrificial metal oxide into a recoverable solid or molten byproduct elemental metal, while dissolving any metal oxides in said waste into said molten glass, the sacrificial oxide being provided in the molten glass in at least stoichiometric amount with respect to the elemental metal and any oxidizable carbon in the radioactive waste;

separating and recovering molten glass containing metal oxides derived from said waste from the bath, and removing byproduct elemental metal from the sacrificial oxide from the bath.

2. The process of claim 1 wherein the removed byproduct elemental metal from the sacrificial oxide is oxidized to a recoverable metallic oxide, and the recoverable metallic oxide is recovered and sent to the molten bath as the sacrificial metal oxide.

3. The process of claim 2 wherein the sacrificial metal oxide is PbO.

4. The process of claim 1 wherein oxidizable carbon is present in the radioactive waste and carbon dioxide is separated from the molten glass bath.

5. The process of claim 1 wherein the radioactive waste comprises spent nuclear reactor fuel.

6. The process of claim 5 wherein the removed byproduct metal is oxidized to a recoverable metallic oxide, and recoverable metallic oxide is recovered and sent to the molten bath as the sacrificial metal oxide.

7. The process of claim 6 wherein the sacrificial metal oxide is PbO.

8. The process of claim 5 wherein the spent fuel is fed to molten glass bath in the form of rods, the rods being clad with a cladding metal, the cladding metal being converted by the sacrificial oxide to an oxide in the glass bath.

9. A process for the conversion of solid radioactive waste comprising providing a bath of molten glass containing a sacrificial metal oxide capable of oxidizing elemental metal and carbon in a radioactive waste while the metal of said sacrificial oxide is reduced and forms a metal oxide soluble in said molten glass;

introducing a solid radioactive waste into said bath of molten glass containing said sacrificial metal oxide, and converting elemental metal in the waste into oxides of said metal which are solubilized in said molten glass, and the sacrificial metal oxide into a reduced metal oxide soluble in the molten glass, while dissolving any oxides in said waste, the sacrificial oxide being provided in the molten glass in at least stoichiometric amount with respect to the elemental metal and any oxidizable carbon in the radioactive waste; and recovering molten glass containing said reduced metal oxides and dissolved metal oxides derived from the waste from the bath.

10. The process of claim 9 wherein the radioactive waste comprises spent nuclear reactor fuel.

11. The process of claim 10 wherein the spent fuel is fed to molten glass bath in the form of rods, the rods being clad with a metal, the metal being converted by the sacrificial oxide to an oxide in the glass bath.

12. The process of claim 9 wherein the sacrificial metal oxide is $Fe_2O_3$.

13. The process of claim 9 wherein oxidizable carbon is present in the radioactive waste and carbon dioxide is separated from the molten glass bath.

14. A process for the conversion of weapons grade plutonium comprising providing a bath of molten glass containing a sacrificial metal oxide capable of oxidizing plutonium and carbon while the metal of the sacrificial oxide is reduced to elemental metal which has limited solubility in said molten glass;

introducing weapons grade plutonium into said bath of molten glass containing said sacrificial metal oxide, and converting plutonium into plutonium oxide which is solubilized in said molten glass, and the metal of the sacrificial metal oxide into a recoverable solid or molten byproduct elemental metal;

the sacrificial oxide being provided in the molten glass in at least stoichiometric amount with respect to the plutonium and any carbon present; separating and recovering molten glass containing plutonium oxide from the bath, and removing byproduct elemental metal from the sacrificial oxide from the bath.

15. The process of claim 14 wherein spent fuel is also introduced into the molten glass bath, the ratio of spent fuel to weapons grade plutonium being at least 6, and the sacrificial oxide is provided in the molten glass in at least stoichiometric amount with respect to the amount of elemental metal and any carbon introduced.

16. The process of claim 14 wherein removed elemental metal from the sacrificial oxide is oxidized to a recoverable metallic oxide, and the recoverable metallic oxide is recovered and sent to the molten bath as the sacrificial metal oxide.

17. The process of claim 16 wherein the sacrificial metal oxide is PbO.

18. A process for the conversion of weapons grade plutonium comprising providing a bath of molten glass containing a sacrificial metal oxide capable of oxidizing plutonium and carbon while the metal of said sacrificial oxide is reduced and forms a metal oxide soluble in said molten glass;

introducing weapons grade plutonium into said bath of molten glass containing said sacrificial metal oxide, and converting plutonium into plutonium oxide which is solubilized in said molten glass, and the metal of the sacrificial metal oxide into a reduced metal oxide soluble in the molten glass, the sacrificial oxide being provided in the molten glass in at least stoichiometric amount with respect to the plutonium and any carbon present; and recovering molten glass containing said reduced metal oxide and plutonium oxide from the bath.

19. The process of claim 18 wherein spent fuel containing an amount of elemental metal is also introduced into the molten glass bath, the ratio of spent fuel to weapons grade plutonium being at least 6, and the sacrificial oxide is provided in the molten glass in at least a stoichiometric amount with respect to the amount of plutonium and elemental metal and any carbon introduced.

20. The process of claim 19 wherein the sacrificial metal oxide is $Fe_2O_3$.

21. A process for the conversion of solid radioactive waste comprising
   providing a first bath of molten glass containing a sacrificial metal oxide capable of oxidizing elemental metal and carbon in the radioactive waste while the metal of the sacrificial oxide is reduced to elemental metal which has limited solubility in said molten glass;
   introducing solid radioactive waste into said first bath of molten glass containing said sacrificial metal oxide, and converting elemental metal in said waste into oxides of said metal which are solubilized in said molten glass, and the metal of the sacrificial metal oxide into a recoverable solid or molten elemental metal, while dissolving oxides in said waste into said molten glass, the sacrificial oxide being provided in the molten glass in each bath in at least stoichiometric amount with respect to any elemental metal and/or carbon added or present from the radioactive waste;
   separating molten glass containing dissolved metal oxides from the waste from the first bath, and adding separated molten glass to a second molten glass bath containing a sacrificial metal oxide capable of oxidizing elemental metal and carbon in the radioactive waste while the metal of the sacrificial oxide is reduced to elemental metal which has limited solubility in said molten glass;
   adding one or more components selected from radioactive waste, glass, precursors of glass, or sacrificial metal oxide to the second glass bath in amount to produce a metal oxides containing molten glass mixture of desired composition; and
   recovering metal oxides containing molten glass mixture of desired composition.

22. The process of claim 21 wherein elemental metal from the sacrificial oxide from the first bath is recovered and is oxidized to a recoverable metallic oxide, and the recoverable metallic oxide is recovered and sent to the first molten bath as the sacrificial metal oxide.

23. The process of claim 22 wherein the sacrificial metal oxide is PbO.

24. The process of claim 21 wherein oxidizable carbon is present in the radioactive waste and carbon dioxide is separated from the first molten glass bath.

25. A process for the conversion of radioactive waste material containing carbon comprising
   providing a bath of molten glass containing a sacrificial metal oxide capable of oxidizing carbon in radioactive waste material containing carbon while the metal of the sacrificial oxide is reduced to elemental metal which has limited solubility in said molten glass;
   introducing radioactive waste material containing carbon into said bath of molten glass containing said sacrificial metal oxide, and converting carbon in said waste into carbon dioxide, and the metal of the sacrificial metal oxide into a recoverable solid or molten byproduct elemental metal, while dissolving any metal oxides in said waste into said molten glass, the sacrificial oxide being provided in the molten glass in at least stoichiometric amount with respect to the oxidizable carbon in the radioactive waste;
   separating carbon dioxide from the bath and separating and recovering molten glass containing metal oxides derived from said waste from the bath, and
   removing byproduct elemental metal from the sacrificial oxide from the bath.

26. A process for the conversion of radioactive waste material containing carbon comprising
   providing a bath of molten glass containing a sacrificial metal oxide capable of oxidizing carbon in the radioactive waste material containing carbon while the metal of said sacrificial oxide is reduced and forms a metal oxide soluble in said molten glass;
   introducing radioactive waste material containing carbon into said bath of molten glass containing said sacrificial metal oxide, and converting carbon in the waste into carbon dioxide and the sacrificial metal oxide into a reduced metal oxide soluble in the molten glass, while dissolving any oxides in said waste, the sacrificial oxide being provided in the molten glass in at least stoichiometric amount with respect to the oxidizable carbon of the radioactive waste;
   separating carbon dioxide from the bath and recovering molten glass containing said reduced metal oxides and dissolved metal oxides derived from the waste from the bath.

27. The process of claim 25 wherein carbon dioxide is separated from the molten glass bath.

28. The process of claim 26 wherein carbon dioxide is separated from the molten glass bath.

* * * * *